United States Patent [19]

Skow

[11] Patent Number: 4,639,644
[45] Date of Patent: Jan. 27, 1987

[54] HIGH VOLTAGE DYNAMIC FOCUSING SYSTEM

[75] Inventor: Lawrence H. Skow, Marlboro, Mass.

[73] Assignee: Raytheon Company, Lexington, Mass.

[21] Appl. No.: 847,103

[22] Filed: Apr. 3, 1986

Related U.S. Application Data

[63] Continuation of Ser. No. 575,081, Jan. 30, 1984.

[51] Int. Cl.$^4$ .............................................. H01J 29/58
[52] U.S. Cl. ................................................... 315/382
[58] Field of Search ...................... 315/382, 365, 370; 358/218; 340/739

[56] References Cited

U.S. PATENT DOCUMENTS

| | | |
|---|---|---|
| 3,412,281 | 11/1968 | Richards, Jr. et al. |
| 3,714,505 | 1/1973 | Lukacs . |
| 3,806,758 | 4/1974 | Lundqvist . |
| 4,230,972 | 10/1980 | Bafaro . |
| 4,249,112 | 2/1981 | McKibben . |
| 4,258,298 | 3/1981 | Hilburn et al. . |
| 4,277,722 | 7/1981 | Hawken et al.' . |
| 4,318,033 | 3/1982 | Eames, Jr. . |
| 4,361,785 | 11/1982 | Stapleton ............................ 315/382 |
| 4,410,841 | 10/1983 | Dusard et al. ....................... 315/382 |
| 4,499,457 | 2/1985 | Hintze ................................. 315/382 |
| 4,549,216 | 10/1985 | Yuki . |

*Primary Examiner*—Theodore M. Blum
*Assistant Examiner*—D. Cain

*Attorney, Agent, or Firm*—Richard M. Sharkansky; Walter F. Dawson

[57] ABSTRACT

A cathode-ray tube display system having a dynamic focus circuit to compensate for the inherent defocusing of an electron beam resulting from differences in the distance the beam must travel between an electron gun projecting such beam and a display screen as the beam is moved from position to position about the screen. The circuit is fed by a variable focusing signal having a predetermined bandwidth extending from zero hertz to a predetermined frequency. A combining network is included in the circuit for combining a reference voltage, an amplified, capacitively-coupled first portion of the applied variable focusing signal, and an amplified second portion of the applied signal to produce, at a focus electrode, a composite focusing signal. The produced composite focusing signal has a nominal focusing voltage level produced in response to the reference voltage and selected to provide proper focusing of the beam when the beam is positioned at the center of the screen. The combining network attenuates the nominal focusing voltage level to a predetermined factor thereof at the output of an amplifier used to amplify the second portion of the applied signal. Circuit components are selected to provide the circuit with a substantially uniform transfer function, relating the applied signal to the composite focusing signal, that is frequency independent over the bandwidth of the applied signal. Thus, the composite focusing signal provides accurate focusing when the beam remains fixed at a single, off-center position on the screen, as well as when the beam is moved about the screen.

16 Claims, 2 Drawing Figures

HIGH VOLTAGE DYNAMIC FOCUSING SYSTEM

This application is a continuation of application Ser. No. 575,081 filed Jan. 30, 1984.

BACKGROUND OF THE INVENTION

This invention relates generally to cathode-ray tube (CRT) display systems and, more particularly, to dynamic focusing circuitry for CRT display systems.

As is known in the art, CRT display systems are used in a wide variety of applications. In CRT display systems without dynamic focusing circuitry, a projected electron beam is focused at a nominal position on the screen, typically the center of the screen. The beam, unfortunately, underqoes defocusing as it is moved to a position on the screen other than the nominal position. Defocusing is particularly pronounced in systems having substantially flat-faced display screens, due to the relatively large differences in the distance that the beam must travel from the electron gun to the correspondingly different points on the screen. In CRT display systems with dynamic focusing circuitry, however, circuitry is provided which attempts to maintain the beam in focus at each beam-directed position on the screen.

Various dynamic focusing circuitry has been described for raster-type display systems to maintain beam focusing as the beam is repetitively scanned at a predetermined rate across the screen. One such system, described in U.S. Pat. No. 3,412,281, uses the periodic beam position control signal to generate the focusing signal. The periodic beam position control signal is preamplified and biased to a predetermined DC level by a DC restoring stage. The DC level is chosen to provide proper beam focusing at the center of the screen, and the periodic variations from the DC level provide proper focus as the beam position is continuously and periodically varied from the center of the screen. To provide sufficient amplification to drive the focus electrodes, however, the preamplified and DC biased signal is fed to a relatively complex output stage which includes gated switching circuitry and associated transformer.

While such raster-type dynamic focusing circuitry may operate satisfactorily when used in some stroke-type display systems, in other systems the focusing circuitry may not provide satisfactory focusing due to, inter alia, the irregular manner in which the electron beam is moved about the screen in a typical stroke display system. More particularly, rather than being a regular, periodic signal having a single, dominant frequency component, as in a raster system, a stroke position control signal includes a spectrum of relatively high frequency components, corresponding to relatively rapid changes in beam position, in addition to both a spectrum of relatively low frequency components, corresponding to relatively slow changes in beam position, and a DC component, corresponding to the steady state focus signal when the beam is at a fixed beam position. Thus, the raster display dynamic focusing circuitry earlier described may not be suitable for stroke operation, since the inductance associated with its transformer might tend to suppress the high frequency components of the focusing signal associated with rapidly changing beam positions, thereby increasing focus response time and impairing tracking between beam focus and beam position when the beam position changes rapidly. Further, the system may not provide accurate focusing when the beam remains fixed at a single, off-center position on the screen, since the beam position control signal (a steady-state signal for fixed beam positions) is AC (capacitively) coupled in the focus circuit, and since the DC restoring stage changes the level of the steady-state signal to a predetermined level, namely, the level required to focus the beam at the center of the screen.

A dynamic focusing circuit for both raster and stroke display systems has been suggested in U.S. Pat. No. 4,258,298. The suggested circuit provides focusing for relatively rapid changes in beam position and maintains beam focusing even when the beam position is changed relatively slowly. This system uses a first circuit for generating a focus signal for slowly changing beam positions and a second circuit for generating a focus signal for rapidly changing beam positions. The outputs of the two circuits are combined into a composite focus signal in a frequency crossover network and such composite signal is added to a high-voltage DC bias signal and applied to a focus electrode to focus the beam. While this system may perform adequately in some applications, it is a rather complex arrangement, requiring sampling, amplification, rectification and feedback in the first, or low frequency, circuit, and transformer coupling in the second, or high frequency, circuit. Moreover, as described above with reference to U.S. Pat. No. 3,412,281, the use of a transformer in a circuit that is required to respond to rapid changes in an input signal may impair the tracking performance of the output to the rapid changes in the input signal.

SUMMARY OF THE INVENTION

In accordance with the present invention, dynamic focusing apparatus is provided having: means for producing a predetermined reference voltage; means, fed by a variable focusing signal, for producing a pair of amplified, variable focusing signals at a pair of output ports; means, including a capacitor coupled to a first one of the pair of output ports, for coupling the first one of the pair of amplified, variable focusing signals through the capacitor to produce a capacitively coupled, first amplified, variable focusing signal; and, combining means for coupling the predetermined reference voltage producing means to an output terminal, for combining therewith at the output terminal the capacitively coupled, first amplified, variable focusing signal and the second one of the pair of amplified, variable focusing signals to produce a composite focusing siqnal at the output terminal, and for attenuating the nominal focusing voltage produced at a output terminal to a predetermined factor thereof at a second one of the pair of output ports of the amplifying means.

In accordance with additional features of the invention, the combining means comprises a plurality of resistors, a first one of the plurality of resistors being coupled between a first end terminal and the output terminal, and a second one of the plurality of resistors being coupled between a second end terminal and the output terminal. The predetermined reference voltage producing means is coupled to the first end terminal, the second one of the pair of output ports of the amplifying means is coupled to the second end terminal, and the capacitor is coupled between the first one of the pair of output ports of the amplifying means and the output terminal. Further in such apparatus, the amplifying means includes: a plurality of amplifiers; and, means for coupling different portions of the variable focusing signal to the plurality of amplifiers, and wherein a first one of the plurality of amplifiers produces the first amplified, variable focusing signal, and a second one of the plurality of amplifiers produces the second amplified, variable focusing signal. In a preferred embodiment of the invention, the variable focusing signal has a predetermined bandwidth extending from zero hertz frequency to a predetermined frequency, and the gain of each one of the plurality of amplifiers, the portions of the variable focusing signal coupled to the plurality of amplifiers, and the resistance of each one of the plurality of resistors are selected to provide a substantially uniform transfer response between the variable focusing signal fed to the amplifying means and the composite focusing signal produced at the output terminal substantially independent of the frequency of the variable focusing signal over the predetermined bandwidth.

In a display system using the dynamic focusing apparatus of the preferred embodiment, an electron beam is projected onto a nominal display position on a display screen, and means are provided for positioning the projected electron beam to display positions on the display screen in accordance with positioning signals. Means, responsive to the positioning signals, generate the variable focusing signal, such variable focusing signal being fed to the dynamic focus apparatus of the present invention. The composite focusing signal produced by the dynamic focus apparatus is coupled to means which focus the projected electron beam at each display position on the display screen to which the projected electron beam is positioned.

With such arrangements, a relatively simple dynamic focusing apparatus is provided adapted to respond to rapid changes in beam position on the display screen to keep the beam focused, and to maintain beam focusing while the beam remains fixed at a single position on the display screen.

BRIEF DESCRIPTION OF THE DRAWINGS

The aforementioned objects and other features of the invention are explained in the following description taken in connection with the accompanying drawings wherein.

DESCRIPTION OF THE PREFERRED EMBODIMENT

Figure 1:
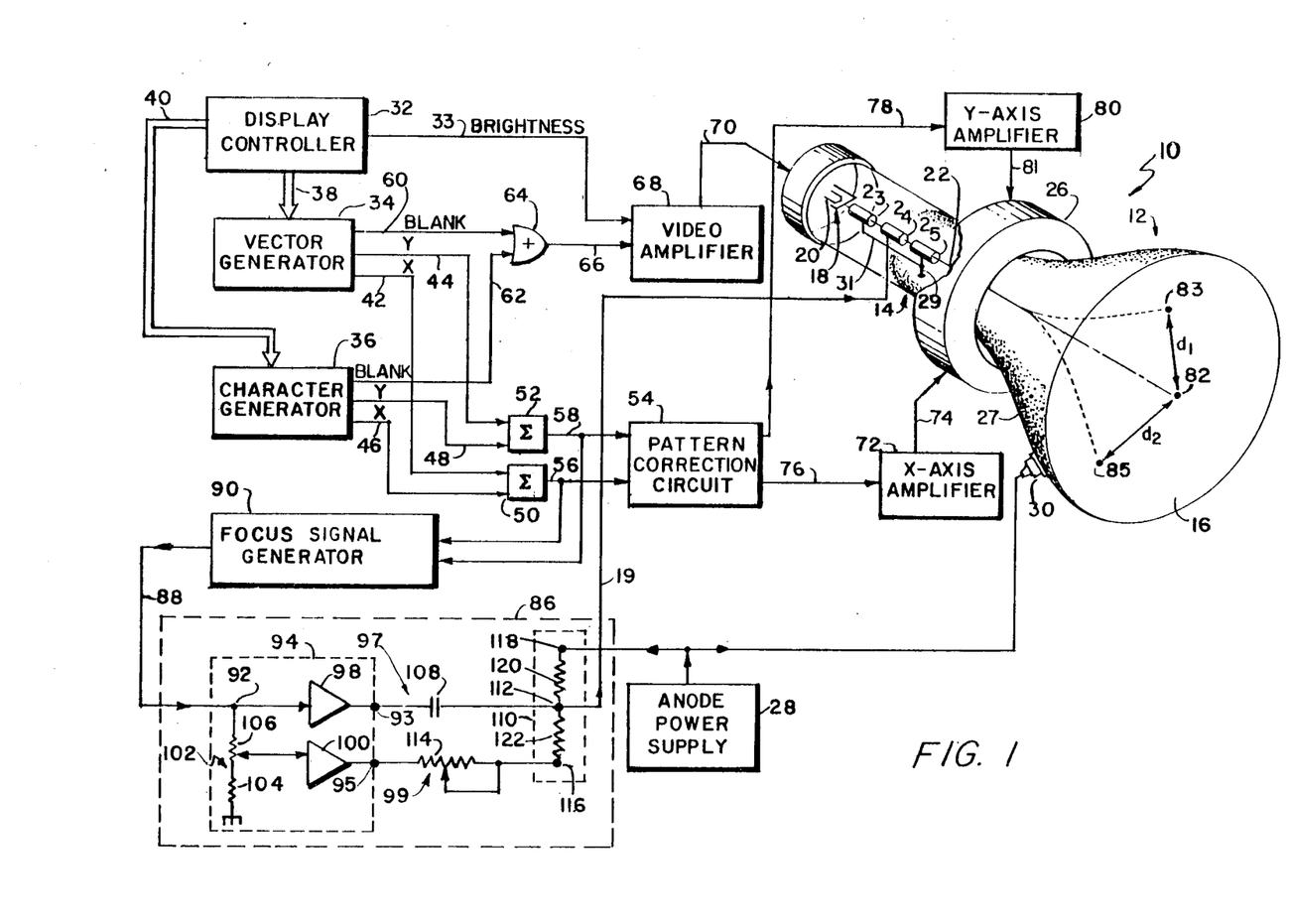
FIG. 1 is a combination block and schematic diagram of the display system containing the dynamic focus circuit according to the present invention.

Referring now to FIG. 1, there is shown generally a stroke-type cathode-ray tube display system 10 with magnetic deflection and electrostatic focusing. The system 10 includes a conventional cathode-ray tube 12 having an envelope 14 and a display screen 16. Envelope 14 comprises an electron gun 18, which may be of the triode design comprising a cathode, grid and screen (not shown separately but which are here shown as a composite gun 18 for the sake of clarity). Electron gun 18, heated by filament 20, emits an electron beam 22. The beam passes through first focus reference anode 23, second focus reference anode 25 and intermediately disposed focus electrode 24, which are all cylindrical in shape and conventional in construction, having apertures of sufficient radius to permit the electron beam to pass coaxially therethrough. After passing through anodes 23, 25 and electrode 24, the beam is deflected to a desired position on display screen 16 by conventional magnetic deflection yoke 26. Conductive coating 27, disposed along the walls of envelope 14, is biased in a conventional manner at a DC voltage level by anode power supply 28, via connector 30, to form an anode which accelerates the beam towards display screen 16. Wire conductor 29 couples conductive coating 27 to the aforementioned second focus reference anode 25, said anode 25 also being coupled to the aforementioned first focus reference anode 23 by wire conductor 31. Thus, the first and second focus reference anodes 23, 25 are biased to the same high voltage DC potential as that of conductive coating 27.

Intermediately disposed focus electrode 24 is fed by a composite focusing signal on line 19, here a high-voltage dynamically changeable signal relative to the fixed DC potential on focus reference anodes 23, 25, to form, along with such anodes 23, 25, a conventional electronic lens. The focal length of the electronic lens is controlled by the high-voltage dynamically changeable focus signal on line 19 generated in a manner to be described in detail hereinafter. Suffice it to say here, however, that the composite focusing signal on line 19 is produced by dynamic focus circuit 86 in response to a low-voltage, variable focusing signal generated on line 88 by focus signal generator 90, such variable focusing signal corresponding to the focus correction required when the beam is positioned at a point on screen 16 other than the center point of the screen, indicated in FIG. 1 as point 82. The variable focusing signal on line 88 is fed to input terminal 92 in amplifier section 94 of dynamic focus circuit 86. Amplifier section 94 produces a pair of amplified, variable focusing signals at a pair of output ports 93, 95. A first amplified, variable focusing signal is produced at first output por 93 by amplifier 98 and is then AC coupled by capacitor 108 to output terminal 112 of voltage divider network 110. Output terminal 112 is coupled by line 19 to focus electrode 24 and is biased to a nominal focusing voltage corresponding to the focusing voltage required to focus the beam at center point 82 of screen 16 and determined by anode power supply 28, resistors 120, 122, potentiometer 114 and the relatively low output impedance of amplifier 100 in a manner to be described in detail hereinafter. Thus, the capacitively-coupled output of amplifier 98 is combined with the nominal (i.e., center) focusing voltage at output terminal 112 to produce a focusing signal corresponding to that required to provide proper beam focusing at both center and off-center beam positions on display screen 16 as the beam is moved about the screen. Due to capacitor 108, however, the focusing signal at output terminal 112 will decay to the nominal (i.e., center) focusing voltage when the variable focusing signal is a steady-state (i.e., zero hertz frequency) signal, occurring when the beam remains fixed at a single position on screen 16. Thus, when the beam is fixed at an off-center position on display screen 16, the focusing signal at output terminal 112 will decay to the nominal (i.e., center) focusing voltage, resulting in beam defocusing at the fixed, off-center position. To compensate for this decay, the second amplified, variable focusing signal produced at second output port 95 by amplifier 100 is DC coupled by potentiometer 114 and resistor 122 to output terminal 112 to properly combine at terminal 112 the second amplified, variable focusing signal with the first amplified, variable focusing signal and the nominal focusing voltage to produce a composite focusing signal at output terminal 112. As will be described in detail hereinafter, the composite focusing signal provides accurate focusing when the beam remains fixed at a single, off-center position on screen 16, as well as when the beam is moved about the screen.

To put it another way, when the position of the beam is rapidly changed, the correspondingly rapidly changing variable focusing signal is coupled to output terminal 112 through two paths: AC coupled path 97 which, being capacitively coupled to the capacitive load presented by the electronic lens (focus electrode 24 and anodes 23, 25), rapidly responds to the correspondingly rapidly changing variable focusing signal to accurately focus the beam; and DC coupled path 99 which, due to the capacitive load of the electronic lens (and AC coupled path 99), responds relatively slowly but maintains a proper focusing voltage at output terminal 112 when the beam is maintained at an off-center position on display screen 16.

The display of information on display screen 16 is essentially controlled by display controller 32 which receives display commands in a conventional manner from a peripheral unit, such as a computer or an operating terminal, not shown. In response to such display commands, display controller 32 activates vector generator 34 if a line is to be drawn, and additionally activates character generator 36 if a character is to be displayed. In order to cause the system to draw a line, display controller 32 transmits to vector generator 34 on data lines 38 the "start" and "end" coordinates of the line to be drawn. Vector generator 34 converts these coordinates in a conventional manner into time-varying X and Y position signals. The X, Y position signals are made available on output lines 42 and 44, respectively. The output on line 60 includes information as to when electron beam 22 is to be blanked or unblanked (i.e., turned "off" or "on"). The brightness level of the line to be drawn is determined by display controller 32, which transmits a brightness control signal on line 33 directly to video amplifier 68.

When a character is to be drawn, display controller 32 sends, via data lines 40, the desired character code to character generator 36. Character generator 36 converts the character information into time varying X and Y position signals which appear on lines 46 and 48, respectively. The reference position on display screen 16 about which the character is to be drawn is set by vector generator 34 on command from display controller 32 as previously described. Character generator 36 also couples, via line 62, a signal which causes electron beam 22 to be blanked or unblanked. The character's brightness is set by display controller 32 in the same manner as that just described for a line.

Arithmetical summers 50 and 52 and logical summer 64 (a conventional "OR" gate) combine the X position, Y position and blanking/unblanking signals, respectively, from vector generator 34 and character generator 36. When a line is to be drawn, the X and Y position signals and the blanking/unblanking signal from vector generator 34 greatly predominate those from character generator 36. Hence, the outputs of the three summers, on lines 56, 58 and 66, respectively, are responsive to substantially only vector generator 34. When a character is to be drawn, vector generator 34 sets the reference X-Y position via lines 42 and 44, respectively, and character generator 36 applies time-varying X-Y position signals via lines 46 and 48, respectively, that are superimposed onto the reference X-Y position signals by arithmetical summers 50 and 52, respectively. Thus, the outputs of summers 50 and 52, on lines 56 and 58, respectively, are composite signals which cause the system to draw the character desired at the position desired. The character's blanking and unblanking is controlled by the logical sum, generated by logical summer 64, of the blanking and unblanking signals from vector generator 34 and character generator 36.

Video amplifier 68 receives the logically summed blanking/unblanking signal from summer 64 via line 66 and the brightness control signal on line 33 from display controller 32. As is well known in the art, video amplifier 68 responds to these signals to selectively turn electron beam 22 "off" or "on" and to control the brightness of the beam by controlling the voltage on line 70 that is applied to electron gun 18, and hence the beam current flowing from electron gun 18 in cathode-ray tube 12.

Pattern correction circuit 54 receives the arithmetically-summed X and Y position signals from summers 50 and 52 via lines 56 and 58, respectively. As is well known in the art, pattern correction circuit 54 applies a correction signal to the X and Y position signals to compensate for the fact that the surface of display screen 16 is substantially flat-faced rather than spherical. Without this compensation, the pattern displayed on display screen 16 would experience what is well-known as a "pincushion" effect and appear quite distorted.

Pattern correction circuit 54 sends the corrected X position signal on line 76 to X-axis amplifier 72. There, the signal undergoes final amplification and is transmitted on line 74 to magnetic deflection yoke 26. Pattern correction circuit 54 also sends the corrected Y position signal to Y-axis amplifier 80, via line 78, where the signal is amplified and applied on line 81 to magnetic deflection yoke 26. Contained in magnetic deflection yoke 26 are the X and Y deflection coils, not shown. As is known, the current generated in the coils by the application of the X and Y position signals produces a resultant magnetic field which deflects beam 22, causing it to strike the desired position on display screen 16.

As previously mentioned, display screen 16 is more nearly flat than spherical; hence, the distance electron beam 22 must travel from electron gun 18 before it strikes screen 16 increases as the beam is deflected away from center point 82 to a peripheral point on display screen 16, such as point 83 (at radial distance $d_1$ from center point 82), or point 85 (at radial distance $d_2$ from center point 82). This change in travel distance results in inherent defocusing of the beam as it is moved about the screen. Dynamic focusing of the beam compensates for this inherent defocusing by changing, with beam position, the focal length of the electronic lens comprising, in the present invention, anodes 23, 25 and focus electrode 24. As noted briefly above, the focal length of the electronic lens is controlled by a high-voltage, composite focusing signal supplied on line 19 by dynamic focus circuit 86 so that the lens continuously and accurately responds to changes in beam position on screen 16 to provide proper beam focusing at each beam position.

Unlike in a raster display system where the electron beam is scanned across the screen at a predetermined, constant rate, in stroke-type display system 10, the electron beam is moved about the screen in an irregular manner—sometimes moving rapidly from position to position and sometimes remaining fixed at a single position (either "on-center" or "off-center") for a relatively long period of time. In system 10, dynamic focus circuit 86 provides a rapidly-changing composite focusing signal to focus electrode 24 in response to rapidly changing beam positions, while also maintaining the focusing voltage at the correct level while the beam remains fixed at a single position on display screen 16.

Input terminal 92 of dynamic focus circuit 86 is fed by a variable focusing signal on line 88 from focus signal generator 90. Applied as inputs to focus signal generator 90 are the summed X and Y position signals from arithmetic summers 50 and 52 via lines 56 and 58, respectively. As is well known in the art, focus signal generator 90 computes, for a given pair of X and Y position signals, the radial distance from center point 82 of screen 16 that electron beam 22 is deflected in accordance with the pair of X and Y position signals. Focus signal generator 90 produces a variable focusing signal having an amplitude proportional to the amount of focus correction that the screen requires at the computed radial deflection distance. Typically, the focusing signal will have its smallest amplitude when the radial deflection of the beam is zero, that is, when the beam is positioned at center point 82 of display screen 16. The center point may be used as a reference and focus signal generator 90 set to produce a zero volt output when the beam is positioned at the center of the screen. As the beam is positionally moved outward on the screen away from the center, the amplitude of the focusing signal increases from zero, here becoming more positive. The maximum output of focus signal generator 90 is here about +10 volts. Of course, the reference point may be chosen to be a point other than center point 82. Likewise, focus signal generator 90 may be set to produce a voltage other than zero volts at the reference point. The focusing signal generated by focus signal generator 90 tracks with beam position; that is, the focusing signal has dynamic (i.e., transient) components corresponding to changing beam positions, and steady-state (i.e., zero hertz frequency) components corresponding to fixed beam positions.

Dynamic focus circuit 86 provides a high-voltage, composite focusing signal on line 19 which effectively replicates the dynamic and steady-state components of the variable focusing signal from focus signal generator 90, amplified with proper gain by amplifier section 94 and biased to the proper DC voltage level, to produce the desired dynamic focus. Dynamic focus circuit 86 receives the variable focusing signal at input terminal 92 of amplifier seciton 94. Amplifier section 94 provides a pair of amplified, variable focusing signals at a pair of output ports 93, 95, which are transmitted from amplifier section 94 along two parallel signal paths: AC coupled path 97; and, DC coupled path 99. The first amplified, variable focusing signal is produced at output port 93 by amplifier 98, here a low impedance amplifier having an input coupled directly to input terminal 92. The second amplified, variable focusing signal is produced at output port 95 by amplifier 100, here a low output impedance device. The input of amplifier 100 is coupled to input terminal 92 via balancing circuit 102. Balancing circuit 102 comprises potentiometer 106 and fixed resistor 104, such circuit 102 being used to control the input level to amplifier 100 for purposes to be discussed hereinafter. The output of amplifier 98 is AC coupled through capacitor 108 to output terminal 112 of voltage divider network 110, output terminal 112 being further coupled to focus electrode 24 by line 19. The output of amplifier 100 is DC coupled through trimming potentiometer 114 to end terminal 116 of voltage divider network 110. Applied to end terminal 118 of voltage divider network 110 is the high voltage output of anode power supply 28 (here 30,000 volts). Resistor 120 is connected between voltage divider network terminals 112 and 118, and resistor 122 is connected between voltage divider network terminals 112 and 116. Voltage divider network 110, being coupled to ground through the relatively low output impedance of amplifier 100, scales the 30,000 volt reference potential at terminal 118 to the nominal focusing voltage at output terminal 112, the level of which corresponds to the focusing voltage required to focus electron beam 22 at center point 82 of display screen 16, here about 5,000 volts.

As discussed, capacitor 108 and the series combination of resistor 122 and potentiometer 114 passively couple the first and second amplified, variable focusing signals from amplifiers 98, 100, respectively, to output terminal 112 and combine therewith the 5,000 volt nominal focusing voltage to form the composite focusing signal at output terminal 112. Capacitor 108 and the series combination of resistor 122 and potentiometer 114 also prevent the 5,000 volt nominal focusing voltage at output terminal 112 from appearing at the output of either amplifier 98 or amplifier 100. More particularly, capacitor 108 completely blocks the 5,000 volt nominal focusing voltage from appearing at the output of amplifier 98, while resistor 122 and potentiometer 114 serially form a voltage divider with the relatively low output impedance of amplifier 100 to greatly attenuate the 5,000 volt nominal focusing voltage at the output of amplifier 100. Thus, composite focusing voltages may be produced at output terminal 112 varying between 5,000 and 5,500 volts, while requiring outputs of only zero to to 500 volts from amplifiers 98, 100. Because amplifiers 98, 100 operate at such low voltages relative to the nominal focusing voltage, amplifier lifetime is increased, while amplifier output response time and power consumption are reduced.

Figure 2:
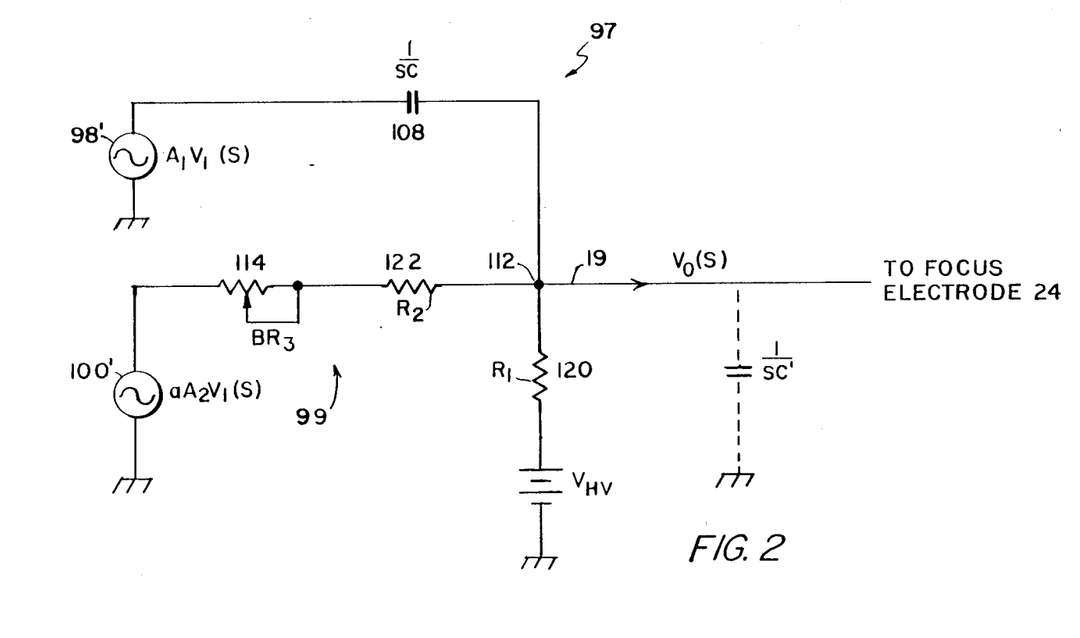
FIG. 2 is an equivalent circuit of the dynamic focus circuit of the system of FIG. 1.

The detailed operation of dynamic focus circuit 86 is perhaps best understood by reference to FIG. 2, which shows an equivalent circuit of dynamic focus circuit 86. In FIG. 2, amplifiers 98 and 100 are represented as ideal voltage sources 98', 100', respectively. The amplitude of the variable focusing signal applied to the input of amplifier 98 is represented as $V_1(s)$, where (s) is the Laplace operator. The variable focusing signal has a predetermined bandwidth, extending from zero hertz frequency (i.e., DC), corresponding to maintaining the beam at a single position on the screen, to some predetermined frequency, corresponding to the fastest rate at which the beam position on the screen will be changed. In analyzing the operation of dynamic focus circuit 86 it is assumed that amplifiers 98, 100 (FIG. 1) each have sufficient bandwidth to provide proper circuit operation over the entire bandwidth of $V_1(s)$. The gain of amplifier 98 is denoted as $A_1$. Therefore, ideal voltage source 98' has an output of $A_1V_1(s)$. The quantity $aV_1(s)$ represents the amplitude of $V_1(s)$ reduced by balancing network 102 (i.e., the voltage-divider combination of potentiometer 106 and fixed resistor 104) and applied to the input of amplifier 100. With the gain of amplifier 100 denoted by $A_2$, ideal voltage source 100' may be represented as having an output of $aA_2V_1(s)$. Further, referring to FIG. 1 and FIG. 2, VHV denotes the voltage from anode power supply 28 available at terminal 118 of voltage divider network 110; $R_1$ and $R_2$ represent the values of resistors 120 and 122, respectively; $BR_3$ signifies the value set for trimming potentiometer 114; and, C denotes the value of capacitor 108. The composite focusing signal produced at output terminal 112 is denoted in FIG. 2 as $V_o(s)$. Capacitor C′, shown in phantom, represents the capacitive load presented to the circuit by the electronic lens formed by focus electrode 24 and first and second focus reference anodes 23, 25, respectively. As noted above, the use of AC coupled path 97 allows dynamic focus circuit 86 to accurately respond to rapid changes in the variable focusing signal fed thereto in response to rapid changes in beam position, notwithstanding the presence of capacitive load C′. It is noted that capacitance C′is quite small (typically on the order of 10 pF) compared with capacitor C in AC coupled path 97; hence, C′ may be disregarded when analyzing the norma operation of dynamic focus circuit 86.

From the basic theory of superposition, the Laplace form of the output of the circuit at terminal 112 may be represented as:

$$V_o(s) = \frac{\frac{1}{sC}(R_2 + BR_3)}{\frac{1}{sC} + R_2 + BR_3} \cdot V_{HV} +$$

$$\frac{\frac{R_1(R_2+BR_3)}{R_1+R_2+BR_3}}{\frac{1}{sC} + \frac{R_1(R_2+BR_3)}{R_1+R_2+BR_3}} \cdot A_1 V_1(s) +$$

$$\frac{\frac{R_1}{sC}}{\frac{1}{sC} + R_1} \cdot aA_2 V_1(s)$$

Simplifying:

$$V_o(s) = \frac{V_{HV}(R_2+BR_3)}{R_1+R_2+BR_3+sC(R_2+BR_3)} +$$

$$\frac{A_1V_1(s)\cdot\frac{sCR_1(R_2+BR_3)}{R_1+R_2+BR_3}}{1+\frac{sCR_1(R_2+BR_3)}{R_1+R_2+BR_3}} + \frac{aA_2V_1(s)R_1}{R_1+(1+sCR_1)(R_2+BR_3)}$$

Putting the above equation into standard form:

$$V_o(s) = \frac{V_{HV}\cdot\frac{R_2+BR_3}{R_1+R_2+BR_3}}{1+\frac{sC(R_2+BR_3)}{R_1+R_2+BR_3}} + \quad (1)$$

$$\frac{A_1V_1(s)\cdot\frac{sCR_1(R_2+BR_3)}{R_1+R_2+BR_3}}{1+\frac{sCR_1(R_2+BR_3)}{R_1+R_2+BR_3}} + \frac{\frac{aA_2V_1(s)R_1}{R_1+R_2+BR_3}}{1+\frac{sCR_1(R_2+BR_3)}{R_1+R_2+BR_3}}$$

Combining $V_1(s)$ terms and considering $V_{HV}$ as solely dc:

$$V_o(s) = \frac{V_{HV}(R_2+BR_3)}{R_1+R_2+BR_3} + \frac{aA_2V_1(s)R_1}{R_1+R_2+BR_3} \cdot \quad (2)$$

$$\left(\frac{1+\frac{s[CA_1(R_2+BR_3)]}{aA_2}}{1+\frac{s[CR_1(R_2+BR_3)]}{R_1+R_2+BR_3}}\right)$$

i.3., $V_o(s) = V_{DC}$ term $+ V_{AC}$ term.

To achieve a relatively uniform transfer function that is substantially independent of the frequency of variable focusing signal $V_1(s)$ over the predetermined bandwidth, the pole-zero pair of the $V_{AC}$ term in Eq. (2) must substantially cancel. That is, resistor and gain values should be chosen to make:

$$1 + s\frac{[CA_1(R_2+BR_3)]}{aA_2} = 1 + s\frac{[CR_1(R_2+BR_3)]}{R_1+R_2+R_3} \quad (3)$$

From Eq. (3), with a little manipulation, it is easily seen that:

$$A_1 = \frac{aA_2R_1}{R_1+R_2+BR_3} \quad (4)$$

Substituting Eq. (4) into Eq. (2):

$$V_o(s) = \frac{V_{HV}(R_2+BR_3)}{R_1+R_2+BR_3} + A_1V_1(s) \quad (5)$$

Eq. (5) illustrates that if circuit resistor and gain values are selected to satisfy Eq. (4), dynamic focus circuit 86 provides a transfer function between variable focusing signal $V_1(s)$ and composite focusing signal $V_o(s)$ that is substantially independent of the frequency of the variable focusing signal, within the operating bandwidth of the variable focusing signal. To put it another way, the transfer response of dynamic focus circuit 86 is substantially uniform over the predetermined bandwidth of the variable focusing signal. Thus, the composite focusing signal produced by dynamic focus circuit 86 will provide accurate beam focusing both when the beam is moved about the screen and when the beam is maintained at a single, fixed position on the screen.

As mentioned previously, it is useful to set focus signal generator 90 to produce a zero volt variable focusing signal $V_1(s)$ when the beam is positioned at center point 82 on screen 16. Therefore, when the beam is positioned at center point 82, composite focusing signal $V_o(s)$ applied to focus electrode 24 will have an amplitude solely determined by the value of the first term of Eq. (5); thus, it is seen that the first term of Eq. (5) represents the 5,000 volt nominal focusing voltage. The focusing voltage applied to focus electrode 24 is always at least this nominal amplitude in the preferred embodiment, since, as discussed earlier, the amplitude of $V_1(s)$ is here never less than zero volts.

From Eq. (5), it is seen that the 5,000 volt nominal focusing voltage will depend solely on the values of $V_{HV}$, $R_1$, $R_2$ and $BR_3$. In the preferred embodiment, and referring to FIG. 2, resistors $R_1$ and $R_2$ are each set to a fixed value chosen to yield approximately the required 5,000 volt nominal focusing voltage. Since $V_{HV}$ (here 30,000 volts) is supplied by fixed anode power supply 28, the 5,000 volt nominal focusing voltage is adjusted to its precise required value by varying $BR_3$ (trimming potentiometer 114). Thus, it is seen that the $R_1$ to $(R_2+BR_3)$ ratio must be set rather high—at about 5:1. (Here, $R_1$ is chosen to be 250 M ohms, and $R_2$ selected to be 40 M ohms.) It is also good design practice to choose the full scale value of a trimming device to be as small as is practicable; therefore, in the preferred embodiment, the full-scale value of $BR_3$ is chosen to be about half the resistance of $R_2$. Thus, the full-scale resistance of $BR_3$ is here chosen to be 20 M ohms, and $BR_3$ is adjusted to approximately 10 M ohms to achieve the 5,000 volt nominal focusing voltage.

As is seen from Eq. (5), the quantity $A_1V_1(s)$ is added to the nominal focusing voltage to produce a composite focusing signal, $V_o(s)$. The composite focusing signal must have sufficient range to provide focusing of the beam at any position on screen 16 (FIG. 1). A typical display screen in a particular cathode-ray tube may require several hundred more volts to focus the electron beam at an outermost point on the screen than at the center point on the screen. The value of $A_1$, that is, the gain of amplifier 98, must therefore be chosen to amplify the zero to 10 volt $V_1(s)$ signal to a signal with a voltage swing of several hundred volts (here, 0 to 500 volts). Thus, in system 10, requiring a 500 volt focus voltage swing and a nominal focusing voltage of 5,000 volts, composite focusing signal $V_o(s)$ applied to focus electrode 24 will range from 5,000 volts to 5,500 volts.

With the values of $V_{HV}$, $R_1$, $R_2$, $BR_3$ and $A_1$ set, the gain of amplifier 100 ($A_2$) need only be set in accordance with Eq (4) in order for dynamic focus circuit 86 to provide the desired transfer function; that is, a uniform transfer function that is substantially independent of the frequency of $V_1(s)$ over the predetermined bandwidth of variable focusing signal $V_1(s)$. Eq. (4) may be rewritten as:

$$A_2 = \frac{(R_1 + R_2 + BR_3)A_1}{aR_1}$$

Since, as discussed, the $R_1$ to $(R_2+BR_3)$ ratio is set rather high such as 5:1, the above equation may be approximated as:

$$A_2 = 1.2 A_1/a \qquad (6)$$

Correction factor "a" represents the fraction of variable focusing signal $V_1(s)$ available at the input to amplifier 100. This fractional amplitude is determined by balancing circuit 102, that is, the voltage-divider combination of potentiometer 106 and fixed resistor 104. It is noted from FIG. 1 that "a" can be varied between one and some minimum value, "d", greater than zero and determined by the value of resistor 104 and the full-scale resistance of potentiometer 106. Eq. (6) may be satisfied either by fixing $A_2$ at a predetermined value and adjusting "a", or by fixing the value of "a" and adjusting $A_2$. The preferred method, however, is to choose a desired value of "d" and then choose $A_2$ according to Eq. (6) for a value of "a" halfway between "d" and one (i.e., $a=d+(1-d)/2$). This allows potentiometer 106 to be adjusted an equal amount on either side of its initial adjustment point in order to compensate for changes in $A_2$ over time.

Referring back to Eq. (1) and concentrating on each of its "$V_1(s)$" terms, it is seen with little difficulty that for relatively high frequencies of $V_1(s)$, corresponding to rapidly changing beam positions, the $aA_2V_1(s)$ term approaches zero, and the output, $V_o(s)$, due to $V_1(s)$ is derived almost entirely from the $A_1V_1(s)$ term. Conversely, when $V_1(s)$ is a low frequency-to-DC signal, corresponding to slowly-changing-to-fixed beam positions, the value of $V_o(s)$ due to $V_1(s)$ is generated by the $aA_2V_1(s)$ term, while the $A_1V_1(s)$ term approaches zero. Applying a little thought to these results, it is evident that dynamic focus circuit 86 behaves as a frequency crossover network with respect to variable focusing signal $V_1(s)$, having an output dominated by the participation of AC coupled path 97 for high frequency variable focusing signals, and dominated by the influence of DC couple path 99 for low frequency-to-DC variable focusing signals.

Referring back to FIG. 1, the composite focusing signal produced at output terminal 112 of dynamic focus circuit 86 is sent on line 19 to focus electrode 24 which, as noted above, acts in cooperation with first focus reference anode 23 and second focus reference anode 25 to form an electronic lens. As previously noted, anodes 23 and 25 are biased to a predetermined DC level (here 30,000 volts) by anode power supply 28. As is well known, the application of the composite focusing signal to focus electrode 24 produces an electric field between focus electrode 24 and first focus reference anode 23, and between focus electrode 24 and second focus reference anode 25. Both electric fields vary correspondingly as the composite focusing signal applied to focus electrode 24 varies in response to changing beam positions on display screen 16. The varying electric fields have a "lensing" effect on electron beam 22 and operate to focus the beam onto display screen 16 at the point at which the beam is positioned.

As discussed, capacitor 108 in FIG. 1 isolates the nominal focusing voltage present at output terminal 112 from amplifier 98, couples the zero-volt referenced output of amplifier 98 to the 5,000 volt nominal focusing voltage present at output terminal 112, and provides capacitive coupling to the capacitive load of the electronic lens. The value of capacitor 108 is selected so that the shape of the output waveform of amplifier 98 is accurately reproduced at output terminal 112. To achieve proper coupling, the capacitance of capacitor 108 should be substantially greater (e.g., 100:1) than the inherent capacitance (C') of the electronic lens formed by focus electrode 24 and first and second focus reference anodes 23 and 25, respectively. As a typical C' value is 10 pF, the value of capacitor 108 is here chosen to be 1,000 pF.

It is noted that the value of capacitor 108 determines the crossover frequency of dynamic focus circuit 86, that is, the frequency of the variable focusing signal $V_1(s)$ at which AC coupled path 97 and DC coupled path 99 each contribute equally to the output of the circuit (i.e., the composite focusing signal). The crossover frequency, $w_o$, is given by the following equation, with C representing the value of capacitor 108:

$$w_o = \frac{1}{\frac{CR_1(R_2 + BR_3)}{R_1 + R_2 + BR_3}}$$

As discussed, $R_1$ and $R_2$ are selected to be 250 M ohms and 40 M ohms, respectively, and $BR_3$ is adjusted to approximately 10 M ohms. Thus, choosing C to be 1,000 pF, it is seen that the crossover frequency, $w_o$, is here approximately 24 radians/sec., or 4 Hz. In theory, the crossover frequency may be made even smaller by increasing the capacitance of capacitor 108. As is well-known, however, high-voltage capacitors having large capacitance values are expensive, difficult to obtain and physically large, thus limiting, as a practical matter, the maximum capacitance of capacitor 108.

In the preferred embodiment of FIG. 1, fixed anode power supply 28 is shown driving both first and second focus reference anodes 23 and 25, respectively, and dynamic focus circuit 86, which in turn drives focus electrode 24. This is a desirable arrangement since it ensures that small perturbations in anode power supply 28, due to temperature, time, etc., are felt equally at focus electrode 24 and anodes 23, 25. In some applications, however, it may not be advantageous to use the anode power supply for both functions, since such usage entails a substantial current drain from the anode power supply. Thus, in a second embodiment of the display system of the present invention, anode power supply 28 drives conductive coating 27 and first and second focus reference anodes 23 and 25 in cathode-ray tube 12 as previously discussed, and a second DC supply provides a predetermined reference voltage (here, 30,000 volts) to dynamic focus circuit 86 via terminal 118 of voltage divider network 110. Since the second power supply does not interface with cathode-ray tube 12, it may be a variable supply. Thus, the 5,000 volt nominal focusing voltage may be set by varying the second DC supply, and trimming potentiometer 114 (BR$_3$) becomes redundant and is either removed completely or adjusted to zero. Further, potentiometer 106 may be adjusted to place the full value of the variable focusing signal at the input to amplifier 100, resulting in a simpler A$_1$/A$_2$ gain relationship that need be satisfied in order to achieve a uniform transfer function that is substantially independent of the frequency of the variable focusing signal over the bandwidth of the variable focusing signal.

Although preferred embodiments of the invention have been described, numerous modifications and alterations would be apparent to one skilled in the art without departing from the spirit and scope of the invention. For example, the dynamic focus circuit may be used in a display system having electrostatic, rather than magnetic, deflection means. This would entail replacing deflection yoke 26 with a pair of X and a pair of Y deflection plates. Also, the dynamic focus circuit could be used with other embodiments of focus electrodes. Further, the dynamic focus circuit of the present invention may be used in a raster display system. It is therefore understood that the scope of the present invention is to be limited only by the appended claims.

What is claimed is:

1. In combination:
   (a) means for producing a predetermined reference voltage;
   (b) means, fed by a variable focusing signal, for producing a pair of amplified, variable focusing signals at a pair of output ports;
   (c) means, including a capacitor coupled to a first one of the pair of output ports, for coupling the first one of the pair of amplified, variable focusing signals through the capacitor to produce a capacitively coupled, first amplified, variable focusing signal; and
   (d) combining means for coupling the predetermined reference voltage producing means to an output terminal to provide a nominal focusing voltage at the output terminal, for combining therewith at the output terminal the capacitively coupled, first amplified, variable focusing signal and the second one of the pair of amplified, variable focusing signals to produce a composite focusing signal at the output terminal, and for attenuating the nominal focusing voltage produced at the output terminal to a predetermined factor thereof at a second one of the pair of output ports of the amplifying means.

2. The combination of claim 1 wherein:
   the combining means comprises a plurality of resistors, a first one of the plurality of resistors being coupled between a first end terminal and the output terminal, and a second one of the plurality of resistors being coupled between a second end terminal and the output terminal, and wherein:
   (a) said predetermined reference voltage producing means is coupled to the first end terminal;
   (b) said capacitor is coupled between the first one of the pair of output ports of the amplifying means and the output terminal; and
   (c) the second one of the pair of output ports of the amplifying means is coupled to the second end terminal.

3. The combination of claim 2 wherein:
   the amplifying means includes: a plurality of amplifiers; and, means for coupling different portions of the variable focusing signal to the plurality of amplifiers, and wherein a first one of the plurality of amplifiers produces the first amplified, variable focusing signal, and a second one of the plurality of amplifiers produces the second amplified, variable focusing signal.

4. The combination of claim 3 wherein the variable focusing signal has a predetermined bandwidth and wherein:
   the gain of each one of the plurality of amplifiers, the portions of the variable focusing signal coupled to the plurality of amplifiers, and the resistance of each one of the plurality of resistors are selected to provide a substantially uniform transfer response between the variable focusing signal fed to the amplifying means and the composite focusing signal produced at the output terminal substantially independent of the frequency of the variable focusing signal over the predetermined bandwidth.

5. The combination of claim 4 wherein:
   the predetermined bandwidth of the variable focusing signal extends from zero hertz frequency to a predetermined frequency.

6. The combination of claim 2 wherein:
   the predetermined reference voltage producing means includes means for varying said predetermined reference voltage.

7. The combination of claim 6 wherein the variable focusing signal has a predetermined bandwidth extending from zero hertz frequency to a predetermined frequency, and wherein:
   the amount of amplification provided by the amplifying means to the variable focusing signal produced at the first output port, the amount of amplification provided by the amplifying means to the variable focusing signal produced at the second output port, the resistance of the first one of the plurality of resistors, and the resistance of the second one of the plurality of resistors are selected to provide a substantially uniform transfer response between the variable focusing signal fed to the amplifying means and the composite focusing signal produced at the output terminal substantially independent of the frequency of the variable focusing signal over the predetermined bandwidth.

8. A display system comprising:

a display screen having a plurality of display positions;

means for projecting an electron beam onto a nominal display position on the display screen;

means for positioning the projected electron beam to display positions on the display screen other than the nominal display position in accordance with positioning signals;

means, responsive to the positioning signals, for generating a variable focusing signal;

means for focusing the projected electron beam at each display position on the display screen to which the projected electron beam is positioned; and a circuit, responsive to the variable focusing signal, for producing a composite focusing signal and coupling said composite focusing signal to the focusing means, said circuit comprising:

(a) means, fed by the variable focusing signal, for producing a first amplified, variable focusing signal at a first output port, and a second amplified, variable focusing signal at a second output port;

(b) means, including a capacitor coupled to the first output port, for coupling the first amplified, variable focusing signal through the capacitor to produce a capacitively coupled, first amplified, variable focusing signal;

(c) means for producing a first predetermined reference voltage; and (d) combining means for coupling the first predetermined reference voltage producing means to an output terminal to provide a nominal focusing voltage at the output terminal, for combining therewith at the output terminal the capacitively coupled, first amplified, variable focusing signal and the second amplified, variable focusing signal to produce the composite focusing signal at the output terminal, and for attenuating the nominal focusing voltage produced at the output terminal to a predetermined factor thereof at the second output port of the amplifying means.

9. The display system of claim 8 wherein:

the combining means comprises a plurality of resistors, a first one of the plurality of resistors being coupled between a first end terminal and the output terminal, and a second one of the plurality of resistors being coupled between a second end terminal and the output terminal, and wherein:

(a) said first predetermined reference voltage producing means is coupled to the first end terminal;

(b) said capacitor is coupled between the first output port of the amplifying means and the output terminal; and (c) the second output port of the amplifying means is coupled to the second end terminal.

10. The display system of claim 9 wherein:

the amplifying means includes: a plurality of amplifiers; and, means for coupling different portions of the variable focusing signal to the plurality of amplifiers, and wherein a first one of the plurality of amplifiers produces the first amplified, variable focusing signal, and a second one of the plurality of amplifiers produces the second amplified, variable focusing signal.

11. The display system of claim 10 wherein the variable focusing signal has a predetermined bandwidth, and wherein:

the gain of the first one of the plurality of amplifiers, the gain of the second one of the plurality of amplifiers, the portions of the variable focusing signal fed to the plurality of amplifiers, and the resistance of each one of the plurality of resistors are selected to provide a substantially uniform transfer response between the variable focusing signal fed to the amplifying means and the composite focusing signal produced at the output terminal substantially independent of the frequency of the variable focusing signal over the predetermined bandwidth.

12. The display system of claim 11 wherein:

said predetermined bandwidth extends from zero hertz frequency to a predetermined frequency.

13. The display system of claim 11 wherein:

the plurality of resistors includes a potentiometer, disposed serially with said second resistor between the second output port of the amplifying means and the output terminal, to vary the nominal focusing voltage at the output terminal.

14. The display system of claim 8 wherein:

the focusing means comprises a plurality of electrodes, a first one of the plurality of electrodes being coupled to the output terminal and being fed by the composite focusing signal, and a second one of the plurality of electrodes being biased at a second predetermined reference voltage.

15. The display system of claim 14 wherein:

the second one of the plurality of electrodes is coupled to the first predetermined reference voltage producing means, said second predetermined reference voltage being equal to the first predetermined reference voltage.

16. The display system of claim 14 wherein:

said plurality of electrodes form a capacitor, and wherein the first amplified, variable focusing signal coupling capacitor has a capacitance substantially greater than the capacitance of the capacitor formed by said plurality of electrodes.

* * * * *